United States Patent
Kim et al.

(10) Patent No.: US 7,860,866 B2
(45) Date of Patent: Dec. 28, 2010

(54) HEURISTIC EVENT CLUSTERING OF MEDIA USING METADATA

(75) Inventors: Michael Han-Young Kim, Issaquah, WA (US); Andrew S. Ivory, Woodinville, WA (US); Ignatius Setiadi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/056,027

(22) Filed: Mar. 26, 2008

(65) Prior Publication Data

US 2009/0248688 A1   Oct. 1, 2009

(51) Int. Cl.
    G06F 17/30 (2006.01)
(52) U.S. Cl. .................... 707/737; 707/752
(58) Field of Classification Search ........... 707/736, 707/737, 749, 752, 803; 382/118
See application file for complete search history.

(56) References Cited

U.S. PATENT DOCUMENTS

| | | | |
|---|---|---|---|
| 6,389,181 B2 | 5/2002 | Shaffer et al. | |
| 6,636,648 B2 * | 10/2003 | Loui et al. | 382/284 |
| 6,889,220 B2 * | 5/2005 | Wolff et al. | 1/1 |
| 7,242,809 B2 | 7/2007 | Hunter et al. | |
| 7,257,571 B2 | 8/2007 | Turski et al. | |
| 7,313,574 B2 | 12/2007 | Paalasmaa et al. | |
| 7,519,200 B2 * | 4/2009 | Gokturk et al. | 382/118 |
| 7,643,686 B2 * | 1/2010 | Kraus et al. | 382/225 |
| 2003/0202773 A1 | 10/2003 | Dow et al. | |
| 2004/0001106 A1 | 1/2004 | Deutscher et al. | |
| 2005/0076056 A1 * | 4/2005 | Paalasmaa et al. | 707/104.1 |
| 2005/0111737 A1 | 5/2005 | Das et al. | |
| 2006/0173746 A1 * | 8/2006 | Cooper et al. | 705/26 |
| 2006/0206495 A1 | 9/2006 | Van Gageldonk et al. | |
| 2006/0253491 A1 * | 11/2006 | Gokturk et al. | 707/104.1 |
| 2006/0294096 A1 * | 12/2006 | Kraus et al. | 707/6 |
| 2007/0061759 A1 | 3/2007 | Klein, Jr. | |
| 2007/0081813 A1 | 4/2007 | Hong et al. | |
| 2007/0115373 A1 * | 5/2007 | Gallagher et al. | 348/231.3 |
| 2008/0133526 A1 * | 6/2008 | Haitani et al. | 707/7 |
| 2009/0055742 A1 * | 2/2009 | Nordhagen | 715/716 |

OTHER PUBLICATIONS

Guha et al. "Clustering Data Streams: Theory and Practice," printed from http://www3.it.deakin.edu.au/~leong/research/streams/Clustering%20data%20streams%20-%20theory%20practice.pdf, 33 pages, 2003.

Gargi, "Consumer Media Capture: Time-Based Analysis and Event Clustering," http://www.hpl.hp.com/techreports/2003/HPL-2003-165.pdf, 15 pages, 2003, Hewlett-Packard Company, USA.

Platt et al., "PhotoTOC: Automatic Clustering for Browsing Personal Photographs," printed from http://research.microsoft.com/~jplatt/PhototoC-pacrim.pdf, 5 pages, Microsoft Corporation, USA.

* cited by examiner

Primary Examiner—Cam-Linh Nguyen
(74) Attorney, Agent, or Firm—Senniger Powers LLP

(57) ABSTRACT

Even clusters are created based n a first metadata and second metadata of the electronic document. The event clusters are associated with an event id and each electronic document is associated with the event identifier of it corresponding event cluster. A user may then browse or otherwise access the electronic documents based on the event identifier.

15 Claims, 5 Drawing Sheets

HEURISTIC EVENT CLUSTERING OF MEDIA USING METADATA

BACKGROUND

Automatic clustering of media items (e.g., digital photographs, video) is useful for organizing and finding items in a library of many media items, whether a local collection of a single user's media or a global collection of many users' media. Currently, there are a number of algorithmic solutions using time differences alone to cluster items. But clustering media files by time does provide adequate clustering by events.

SUMMARY

Aspects of the invention overcome one or more vulnerabilities associated with event clustering of electronic documents by creating event clusters based on a first metadata and second metadata of the electronic documents. The event clusters are each associated with an event identifier and each electronic document is associated with the event identifier of its corresponding event cluster. A user may then browse or otherwise access the electronic documents based on the event identifier.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
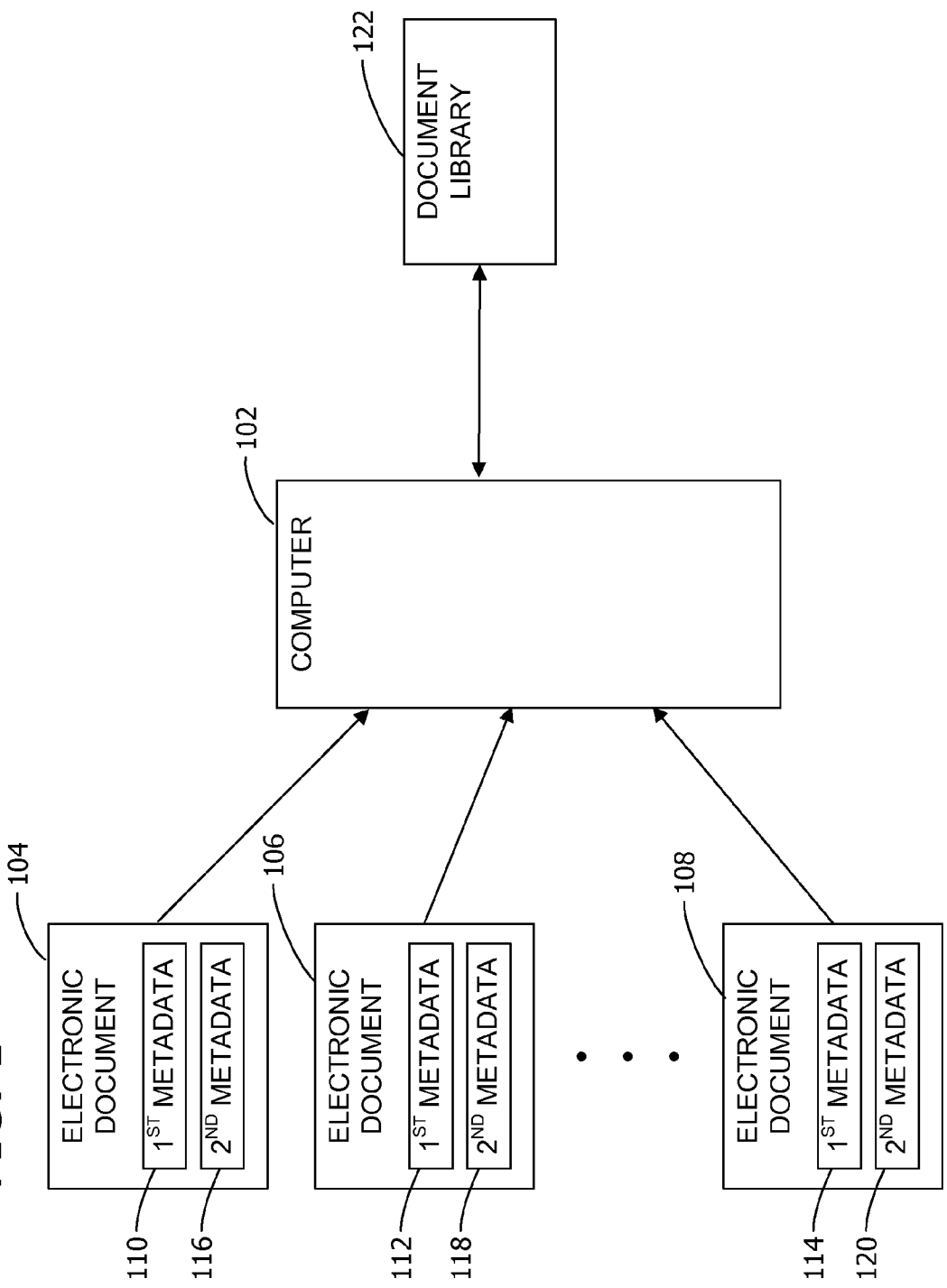
FIG. 1 is a block diagram illustrating one example of a suitable computing system environment in which the invention may be implemented.

FIG. 1 is a block diagram illustrating one example of a suitable computing system environment in which the invention may be implemented. A computer 102 receives a plurality of electronic documents (e.g., electronic document 104, electronic document 106, electronic document 108). In an embodiment, the electronic document (e.g., electronic document 104, electronic document 106, electronic document 108) includes one or more of the following: a digital photograph, a digital sound recording, a digital video recording, a digital image, computer file, and an electronic document.

The electronic documents (e.g., electronic document 104, electronic document 106, electronic document 108) include first metadata (e.g., first metadata 110, first metadata 112, first metadata 114) and second metadata (e.g., second metadata 116, second metadata 118, second metadata 120). The first and second metadata may be created when the electronic document is created or the first and second metadata may be associated with the electronic document after the electronic document is created. Additionally, the first and second metadata may stored with the electronic document as shown in FIG. 1 or the metadata may be stored in a memory location associated with the electronic document. In an embodiment, the first metadata is time metadata and the second metadata is location metadata. Alternatively, the first metadata is location metadata and the second metadata is time metadata.

The computer 102 sorts a plurality of electronic documents (e.g., electronic document 104, electronic document 106, electronic document 108) into order based on the first metadata (e.g., first metadata 110, first metadata 112, first metadata 114). Next, the computer 102 groups the sorted electronic documents into event clusters based on the first metadata (e.g., first metadata 110, first metadata 112, first metadata 114) and the second metadata (e.g., second metadata 116, second metadata 118, second metadata 120). Each event cluster contains one or more electronic documents in order with respect to the first metadata (e.g., first metadata 110, first metadata 112, first metadata 114).

Within each cluster, at least one of the following condition is true (1) a first difference between the first metadata (e.g., first metadata 110, first metadata 112, first metadata 114) associated with consecutive electronic documents within the event cluster is less than a determined first threshold and (2) a second difference between the second metadata (e.g., second metadata 116, second metadata 118, second metadata 120) associated with consecutive electronic documents is less than a determined second threshold. In an embodiment, the first and second thresholds each include one or more of the following: a fixed threshold, a relative threshold, a predefined threshold, a user specified threshold, and an algorithmically determined threshold. The order of the electronic documents is maintained across the event clusters such that the subsequent event clusters do not contain electronic documents with an order less with respect to the first metadata (e.g., first metadata 110, first metadata 112, first metadata 114) than the electronic documents of previous event clusters.

In an embodiment, the computer 102 associates each electronic document with an event identifier associated with its corresponding event cluster. The computer 102 stores the electronic documents and its associated event identifier in a library of electronic documents 122. A user may browse or otherwise access the electronic documents of the library based on the event identifiers.

Figure 2:
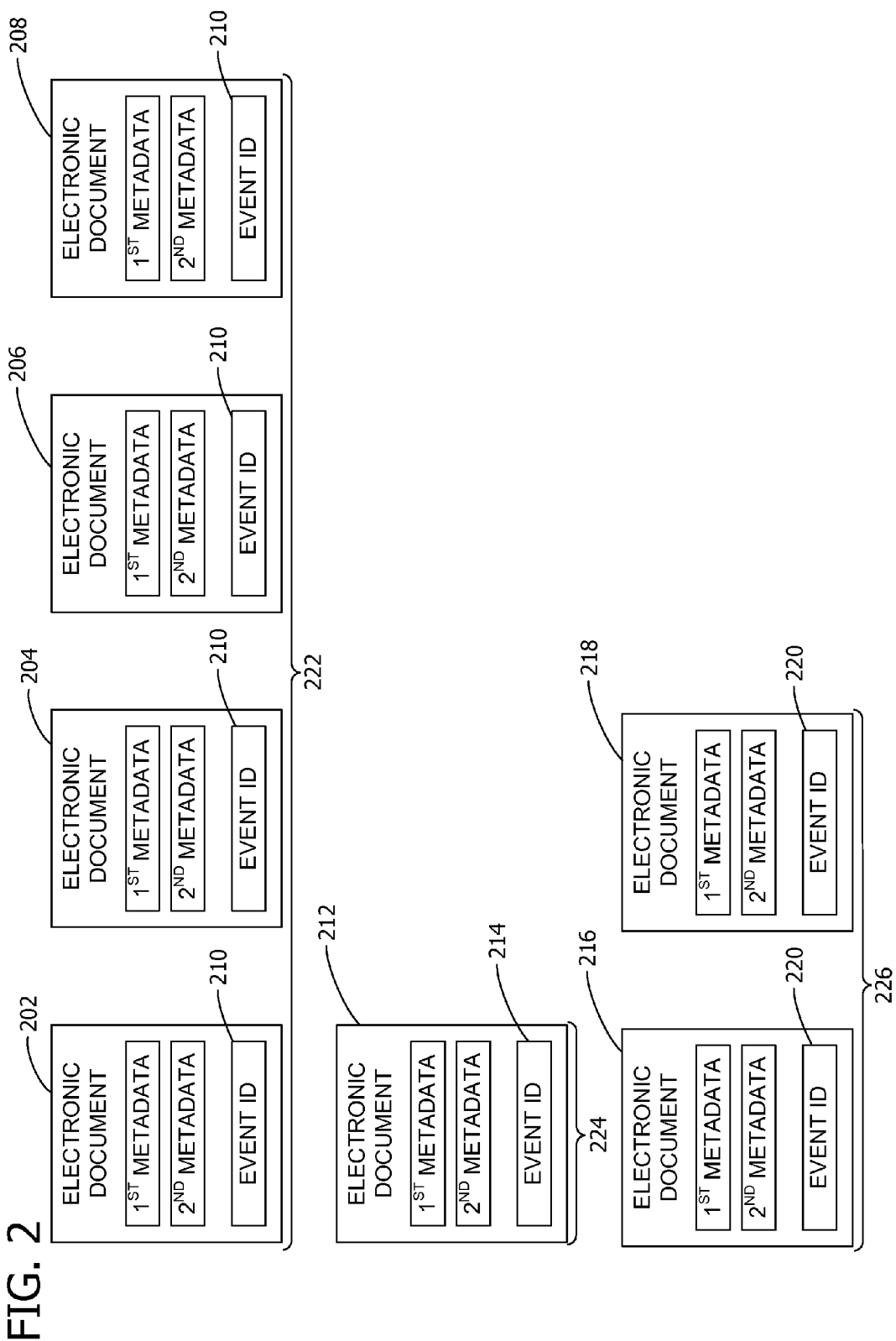
FIG. 2 is an exemplary block diagram illustrating a document library.

FIG. 2 is an exemplary block diagram illustrating a document library 122. The document library 122 includes three event clusters 222, 224, 226. The first event cluster 222 includes four electronic documents 202, 204, 206, 208. Each of the electronic documents 202, 204, 206, 208 in the first event cluster 222 is associated with the same event identifier 210. The second event cluster 224 includes a single electronic document 212. The electronic document 212 in the second event cluster 224 is associated with the event identifier 214. And, the third event cluster 226 includes two electronic documents 216, 218. Each of the electronic documents 216, 218 in the third event cluster 226 is associated with the same event identifier 220.

Each event cluster 222, 224, 226 contains one or more electronic documents in order with respect to the first metadata. Within each cluster, at least one of the following conditions is true (1) a first difference between the first metadata associated with consecutive electronic documents within the event cluster is less than a determined first threshold and (2) a second difference between the second metadata associated with electronic document 204 and electronic document 206 within the first event cluster 222 is less than a determined second threshold. For example, a first difference between the first metadata associated with electronic document 204 and electronic document 206 within the first event cluster 222 is less than the determined first threshold.

The order of the electronic documents is maintained across the event clusters 222, 224, 226 such that the subsequent event clusters do not contain electronic documents with an order less with respect to the first metadata than the electronic documents of previous event clusters. For example, event cluster 226 does not contain electronic documents with an order less with respect to the first metadata than the electronic documents of previous event clusters 222, 224.

For example, suppose Joe has dinner with family in the suburbs, then goes to a party directly afterwards in the city 20 miles away. Photos are taken at the end of family dinner, the beginning of a party, and then a group photos are taken at the end of a party three hours after the beginning of the party. Ideally, two event clusters would be created: dinner with family and party with friends. However, using time alone with a short threshold would incorrectly create the following two clusters. The first cluster would include the photos taken at dinner with the family and the early party photos while the second cluster would include the late party photos. However, if the time threshold is four hours combined with a location threshold of 10 miles, the photos will be clustered correctly where the first cluster would include the photos taken at dinner with the family and the second cluster would include the early party photos and the late party photos. Advantageously, by selecting one type of metadata (e.g., time, location) as the primary differentiator and then using a second type of metadata as a secondary differentiator, the clustering will correctly present the photos as separate events and lower the rate of false positives while doing so.

Figure 3:
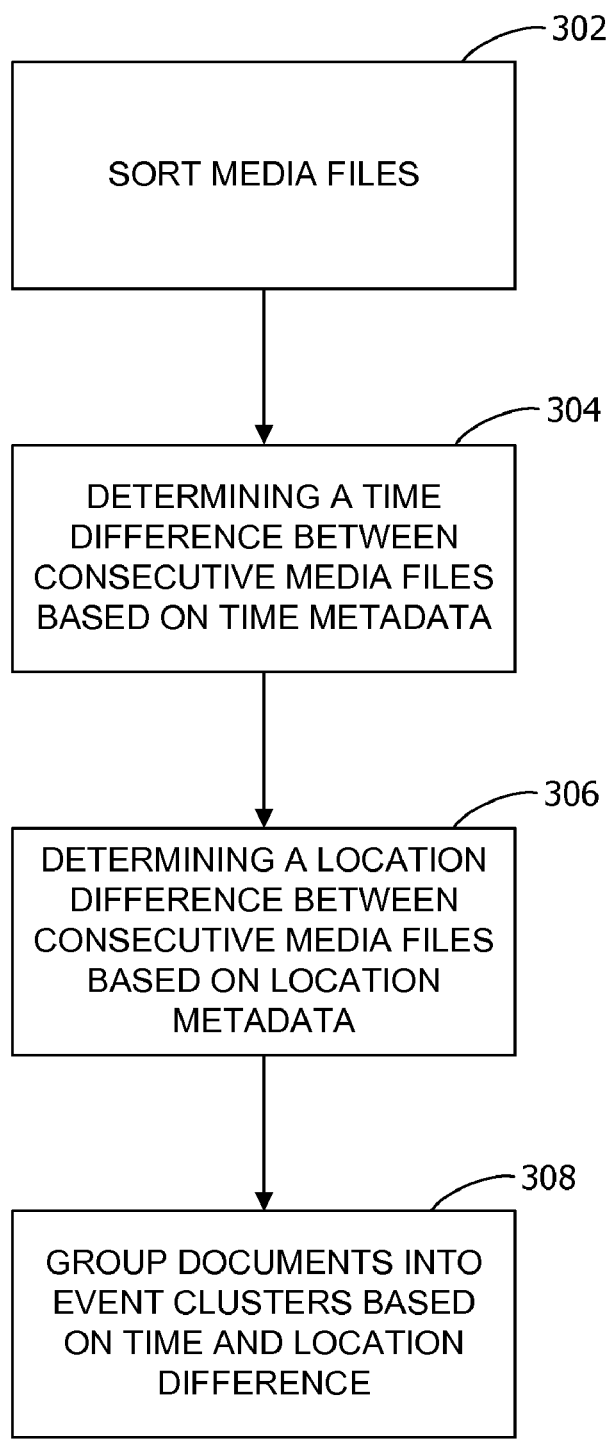
FIG. 3 is an exemplary flow diagram for clustering digital media files.

FIG. 3 is a flow diagram for method for clustering digital media files (e.g., electronic document 104, electronic document 106, electronic document 108). At 302, the computer 102 sorts a plurality of digital media files. In an embodiment, the digital media file each include one or more of the following: a digital photograph, a digital sound recording, a digital video recording, and a digital image. Each of the digital media files is associated with time metadata (e.g., first metadata 110, first metadata 112, first metadata 114) and location metadata (e.g., second metadata 116, second metadata 118, second metadata 120). The computer 102 sorts the digital media files into chronological order based on the time metadata.

In an embodiment, the time metadata is the time and date the digital media file was captured and is generated by an electronic device (e.g., digital camera, digital video camera, cell phone) capturing the digital media file. In another embodiment, the location metadata is GPS (global positioning satellite) data from the place the digital media file was captured and generated by an electronic device (e.g., digital camera, digital video camera, cell phone) capturing the digital media file.

At 304, the computer 102 determines a time difference between consecutive digital media files in the chronological order based on the time metadata. And, at 306, the computer 102 determines a location difference between consecutive digital media files in the chronological order based on the location metadata.

At 308, the computer 102 groups the sorted digital media files into event clusters (e.g., event cluster 222, 224, 226) based on the determined time difference and the determined location distance. Each event cluster contains one or more digital media files in chronological order. Within each cluster, at least one of the following conditions is true (1) the time difference between two consecutive digital media files within each event cluster is less than a time threshold and (2) the location difference between two consecutive digital media files within each event cluster is less than a location threshold. In other words, the time difference between two consecutive digital media files within each event cluster is less than a time threshold and/or the location difference between two consecutive digital media files within each event cluster is less than a location threshold. By using "AND" we will end up with more restrictive clustering (e.g., having more number of events assuming other parameters are fixed), and using "OR" we end up with less restrictive clustering (e.g., having less number of events).

In an embodiment, the location difference is a straight-line difference between location coordinates of the location metadata. Alternatively, the location difference is a difference based on the distance traveled by road between location coordinates of the location metadata. Additionally, the chronological order of the digital media files is maintained across the event clusters such that subsequent event clusters do not contain digital media files earlier in time than the digital media files of previous event clusters. In an embodiment, the time and location thresholds each includes one or more of the following: a fixed threshold, a relative threshold, a predefined threshold, a user specified threshold, and an algorithmically determined threshold. For example, an algorithmically determined threshold includes the difference of the log of the difference from the average log of differences between adjacent digital media files.

In an embodiment, the computer 102 associates each digital media files with an event identifier (e.g., event identifier 210, 214, 220) associated with its corresponding event cluster. The computer 102 stores the digital media files and its associated event identifier in a library of digital media files (e.g., document library 122). A user may browse otherwise access the digital media files of the library based on the event identifiers. In an embodiment, the digital media files are stored in folders based on their associated event identifiers.

It is to be understood that steps 304, 306 and 308 may be combined without deviating from aspects of the invention. In an embodiment, comparing two subsequent media as shown by the following exemplary pseudocode performs these operations:

Set PreviousMedia=NULL

For each media file do the following:

```
If PreviousMedia is NULL
    Set new eventID for CurrentMedia
Else
    If difference between CurrentMedia's time metadata and
    PreviousMedia's time metadata within the time threshold *or/and* the
    difference between CurrentMedia's location metadata and
    PreviousMedia's time metadata within the location timethreshold
        Set eventID for CurrentMedia = eventID for PreviousMedia
    Else
        Set new eventID for CurrentMedia
PreviousMedia = CurrentMedia
```

Figure 4:
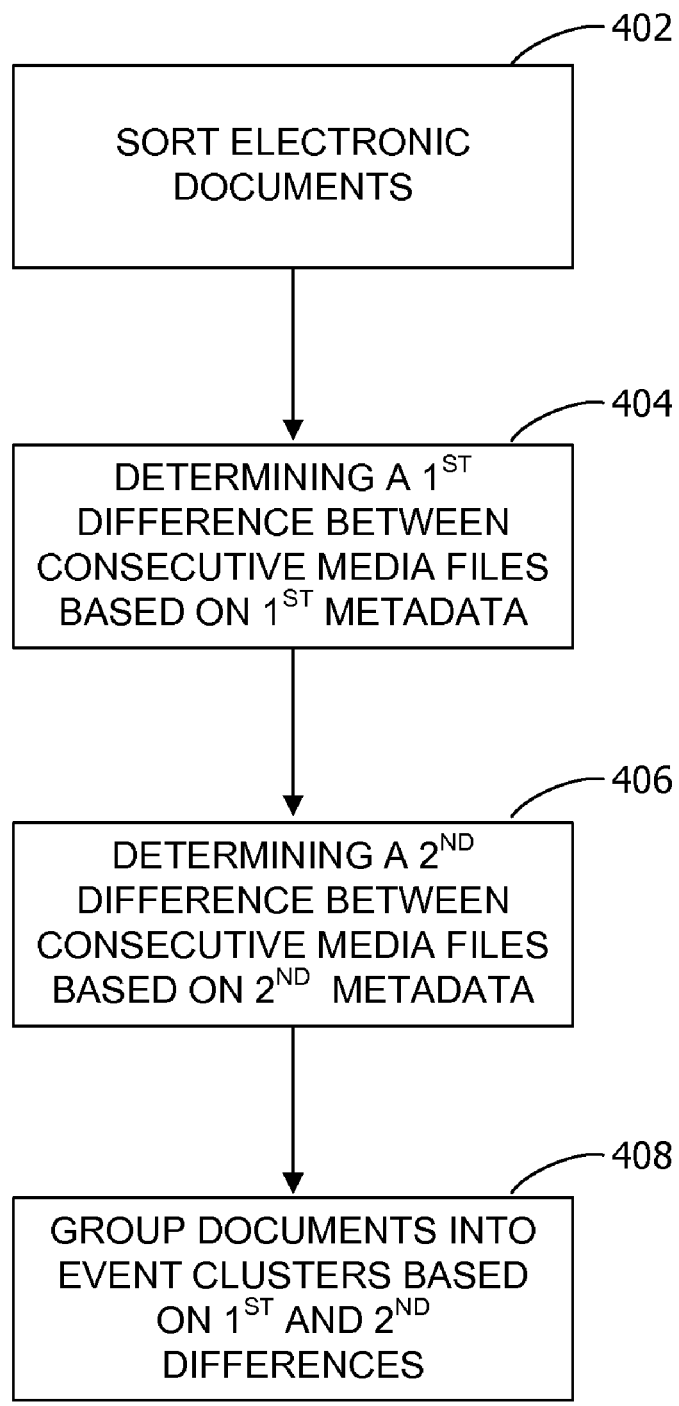
FIG. 4 is an exemplary flow diagram for method for clustering electronic documents.

FIG. 4 is an exemplary flow diagram for method for clustering electronic documents (e.g., electronic document 104, electronic document 106, electronic document 108). At 402, the computer 102 sorts a plurality of electronic documents (e.g., electronic document 104, electronic document 106, electronic document 108). In an embodiment, the electronic documents each include one or more of the following: a digital photograph, a digital sound recording, a digital video recording, a digital image, computer file, and an electronic document.

Each electronic document is associated with first metadata (e.g., first metadata 110, first metadata 112, first metadata 114) and second metadata (e.g., second metadata 116, second metadata 118, second metadata 120). In an embodiment, the first and second metadata are created when the electronic document is created. The electronic documents being sorted into order based on the first metadata (e.g., first metadata 110, first metadata 112, first metadata 114).

At 404, the computer 102 a first difference between consecutive digital media files in the order based on the first metadata (e.g., first metadata 110, first metadata 112, first metadata 114). And, at 406, the computer 102 a second difference between consecutive digital media files in the order based on the second metadata (e.g., second metadata 116, second metadata 118, second metadata 120).

At 408, the computer groups the sorted electronic documents into event clusters (e.g., event cluster 222, 224, 226) based on the determined first difference and the determined second difference. Each event cluster contains one or more electronic documents in order with respect to the first metadata. Within each cluster, at least one of following conditions is true (1) the first difference between the first metadata associated with two consecutive electronic documents within the event cluster is less than a first threshold and (2) the second difference between the second metadata associated with two consecutive electronic documents within the event cluster is less than a second threshold. In other words, the first metadata between two electronic documents within each event cluster is less than a first threshold and/or the second metadata difference between two consecutive electronic documents within each event cluster is less than a second threshold. By using "AND" we will end up with more restrictive clustering (e.g., having more number of events assuming other parameters are fixed), and using "OR" we end up with less restrictive clustering (e.g., having less number of events).

In an embodiment, the first and second thresholds each include one or more of the following: a fixed threshold, a relative threshold, a predefined threshold, a user specified threshold, and an algorithmically determined threshold. For example, an algorithmically determined threshold includes the difference of the log of the difference from the average log of differences between adjacent electronic media file.

The order of the electronic documents is maintained across the event clusters such that subsequent event clusters do not contain electronic documents earlier in the order with respect to the first metadata than the electronic documents of previous event clusters.

In another embodiment, the computer 102 associates each electronic document with an event identifier (e.g., event identifier 210, 214, 220) associated with its corresponding event cluster (e.g., event cluster 222, 224, 226). And, the computer 102 stores each of the electronic documents and their associated event identifier in a library of electronic documents (e.g., document library 122) wherein a user may browse or otherwise access the electronic documents of the library based the event identifiers. In an embodiment, the electronic documents are stored in folders based on their associated event identifiers.

In another embodiment, the first metadata is time metadata and the second metadata is location metadata. Alternatively, the first metadata is location metadata and the second metadata is time metadata. The time metadata is the time and date the electronic document was captured and is generated by an electronic device capturing the electronic document. And, the location metadata is GPS (global positioning satellite) data from the place the electronic document was captured and generated by an electronic device capturing the electronic document.

Figure 5:
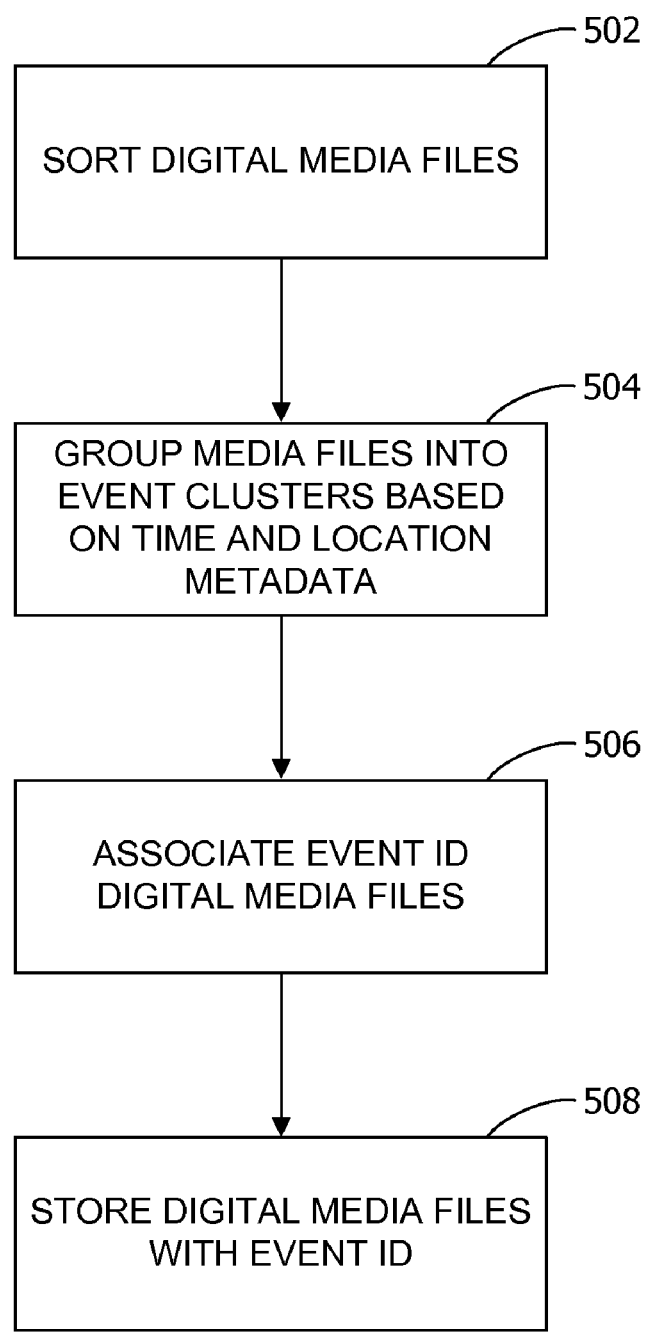
FIG. 5 is an exemplary flow diagram for method for clustering electronic documents.

FIG. 5 is an exemplary flow diagram for creating event clusters (e.g., event cluster 222, 224, 226) within a library of digital media files (e.g., document library 122). At 502, the computer 102 sorts a plurality of digital media files (e.g., electronic document 104, electronic document 106, electronic document 108). Each of the digital media files is associated with time metadata and location metadata. The computer 102 sorts the digital media files into chronological order based on the time metadata. The time metadata is related to the time and date the digital media file was captured and is generated by an electronic device capturing the digital file and the location metadata is GPS (global positioning satellite) data from the place the digital media file was captured and generated by an electronic device capturing the digital media file.

At 504, the computer 102 groups the sorted digital media files into event clusters based on the time metadata and the location metadata wherein each event cluster (e.g., event cluster 222, 224, 226) contains one or more digital media files in order with respect to the time metadata. A time difference between consecutive digital media files within each event cluster is less than a determined time threshold based on the time metadata. A location difference between consecutive digital media files within each event cluster is less than a location threshold. And, the chronological order of the digital media files is maintained across the event clusters such that the subsequent event clusters do not contain digital media files earlier in time than the digital media files of previous event clusters.

At 506, the computer 102 associates each of digital media files with an event identifier (e.g., event identifier 210, 214, 220) associated with its corresponding event cluster (e.g., event cluster 222, 224, 226). At 508, the computer 102 stores the digital media files and associated event identifiers in the library of digital media files (e.g., document library 122). The digital media files of the library are browseable by a user or otherwise accessible based on the event identifiers.

Referring again to FIG. 1, FIG. 1 shows one example of a general purpose computing device in the form of a computer 102. In one embodiment, a computer such as the computer 102 is suitable for use in the other figures illustrated and described herein. Computer 102 has one or more processors or processing units and a system memory.

The computer 102 typically has at least some form of computer readable media. Computer readable media, which include both volatile and nonvolatile media, removable and non-removable media, may be any available medium that may be accessed by computer 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 102.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory includes computer storage media in the form of removable and/or non-removable, volatile and/or nonvolatile memory. The computer 102 may also include other removable/non-removable, volatile/nonvolatile computer storage media. Removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The drives or other mass storage devices and their associated computer storage media discussed above, provide storage of computer readable instructions, data structures, program modules and other data for the computer 102.

The computer 102 may operate in a networked environment using logical connections to one or more remote computers. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 102, embodiments are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer 102 executes computer-executable instructions such as those illustrated in the figures to implement aspects of the invention.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the invention.

Embodiments may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for clustering digital media files by a computing device, comprising:

sorting, by the computing device, a plurality of digital media files, said digital media files each including time metadata and location metadata associated therewith, said digital media files being sorted into chronological order based on the time metadata;

determining, by the computing device, a time difference between consecutive digital media files in the chronological order based on the time metadata;

determining, by the computing device, a location difference between consecutive digital media files in the chronological order based on the location metadata;

grouping, by the computin device, the sorted digital media files into event clusters based on the determined time difference and the determined location difference, wherein each event cluster contains one or more digital media files in chronological order;

associating, by the computing device, each of the digital media files with an event identifier associated with its corresponding event cluster;

storing, by the computing device, the digital media files and associated event identifiers in a library of digital media files, wherein the digital media files are stored in folders based on their associated event identifiers, and wherein the digital media files of the library are browsable by a user based on the event identifiers;

wherein at least one of following conditions is true (1)the time difference between two consecutive digital media files within each event cluster is less than a time threshold and (2) the location difference between two consecutive digital media files within each event cluster is less than a location threshold; and wherein the chronological order of the digital media files is maintained across the event clusters such that subsequent event clusters do not contain digital media files earlier in time than the digital media files of previous event clusters.

2. The method of claim 1, wherein the time metadata is the time and date the digital media file was captured and is generated by an electronic device capturing the digital media file; and wherein the location metadata is GPS (global positioning satellite) data from the place the digital media file was captured and is generated by an electronic device capturing the digital media file.

3. The method of claim 1, wherein the time and location thresholds each include one or more of the following: a fixed threshold, a relative threshold, a predefined threshold, a user specified threshold, and an algorithmically determined threshold.

4. The method of claim 1, wherein the location difference includes one of more of the following: a straight-line difference between location coordinates of the location metadata and a road difference based on the distance traveled by road between location coordinates of the location metadata.

5. The method of claim 1, wherein the digital media files each include one or more of the following: a digital photograph, a digital sound recording, a digital video recording, and a digital image.

6. A method for clustering electronic documents by a computing device, said method comprising:

sorting, by the computing device, a plurality of electronic documents, said electronic documents each including first metadata and second metadata associated therewith, said electronic documents being sorted into an order based on the first metadata;

determining, by the computing device, a first difference between consecutive digital media files in the order based on the first metadata;

determining, by the computing device, a second difference between consecutive digital media files in the order based on the second metadata;

grouping, by the computin device, the sorted electronic documents into event clusters based on the determined first difference and the determined second difference, wherein each event cluster contains one or more electronic documents in order with respect to the first metadata;

associating, by the computing device, each of the electronic documents with an event identifier associated with its corresponding event cluster;

storing, by the computing device, each of the electronic documents and its associated event identifier in a library of electronic documents, wherein the electronic documents of the library are browsable by a user based on the event identifier;

wherein at least one of following conditions is true (1)the first difference between the first metadata associated with two consecutive electronic documents within the event cluster is less than a first threshold and (2) the second difference between the second metadata associated with two consecutive electronic documents within the event cluster is less than a second threshold; and wherein the chronological order of the electronic documents is maintained across the event clusters such that subsequent event clusters do not contain electronic documents earlier in the order with respect to the first metadata than the electronic documents of previous event clusters.

7. The method of claim 6, wherein the electronic documents each include one or more of the following: a digital photograph, a digital sound recording, a digital video recording, a digital image, computer file, and an electronic document.

8. The method of claim 6, wherein the first metadata is time metadata and the second metadata is location metadata.

9. The method of claim 6, wherein the first metadata is location metadata and the second metadata is time metadata.

10. The method of claim 9, wherein the time metadata is the time and date the electronic document was captured and is generated by an electronic device capturing the electronic document; and wherein the location metadata is GPS (global positioning satellite) data from the place the electronic document was captured and generated by an electronic device capturing the electronic document.

11. The method of claim 6, wherein the first and second metadata are created when the electronic document is created.

12. The method of claim 6, wherein the first and second thresholds each include one or more of the following: a fixed threshold, a relative threshold, a predefined threshold, a user specified threshold, and an algorithmically determined threshold.

13. A method for creating event clusters within a library of digital media files, comprising:

sorting, by a computing device, a plurality of digital media files, said digital media files each including time metadata and location metadata associated therewith, said digital media files being sorted into chronological order based on the time metadata, wherein the time metadata is related to the time and date the digital media file was captured and is generated by an electronic device capturing the digital file, and wherein the location metadata is GPS (global positioning satellite) data from the place the digital media file was captured and is generated by an electronic device capturing the digital media file;

grouping, by the computing device, the sorted digital media files into event clusters based on the time metadata and the location metadata, wherein each event cluster contains one or more digital media files in order with respect to the time metadata, wherein at least one of following conditions is true (1) a time difference between consecutive digital media files within each event cluster is less than a time threshold based on the time metadata and (2) a location difference between consecutive digital media files within each event cluster is less than a location threshold based on the location metadata, wherein the location difference includes a road difference based on the distance traveled by road between location coordinates of the location metadata; and wherein the chronological order of the digital media files is maintained across the event clusters such that subsequent event clusters do not contain digital media files earlier in time than the digital media files of previous event clusters;

associating each of the digital media files with an event identifier associated with its corresponding event cluster; and storing the digital media files and associated event identifiers in the library of digital media files, wherein the digital media files are stored in folders based on their associated event identifiers, and wherein the digital media files of the library are browsable by a user based on the event identifiers.

14. The method of claim 13, wherein the time and location thresholds each include one or more of the following: a fixed threshold, a relative threshold, a predefined threshold, a user specified threshold, and an algorithmically determined threshold.

15. The method of claim 13, wherein the location difference further includes a straight-line difference between location coordinates of the location metadata.

* * * * *